United States Patent [19]

Podgorski

[11] Patent Number: 4,677,641
[45] Date of Patent: Jun. 30, 1987

[54] SIMPLIFIED READOUT OPTICS FOR A RING LASER APPARATUS

[75] Inventor: Theodore J. Podgorski, Maplewood, Minn.

[73] Assignee: Honeywell Inc., Minneapolis, Minn.

[21] Appl. No.: 665,413

[22] Filed: Oct. 26, 1984

[51] Int. Cl.⁴ ............................................. H01S 3/08
[52] U.S. Cl. ...................................... 372/108; 372/94
[58] Field of Search ........................ 372/94, 107, 108

[56] References Cited

U.S. PATENT DOCUMENTS 4,271,397  6/1981  Stiles et al. ............................ 372/94

Primary Examiner—William L. Sikes
Assistant Examiner—Robert E. Wise
Attorney, Agent, or Firm—Robert A. Pajak

[57] ABSTRACT

An optical readout arrangement features a unitary optical element which serves both as a substrate for the corner mirror of the ring laser gyro and as a prismatic beam folding and combining arrangement for the readout elements.

5 Claims, 1 Drawing Figure

SIMPLIFIED READOUT OPTICS FOR A RING LASER APPARATUS

BACKGROUND OF THE INVENTION

The present invention relates to a ring laser angular rate sensor, a so-called ring laser gyro. More particularly, it relates to a readout apparatus for such a ring laser gyro.

A so-called ring laser gyroscope is basically a laser apparatus having a ring type resonant cavity, typically triangular in configuration. The laser beam is directed around the triangular path by suitable mirrors positioned at each of the corners of the triangular structure. In most cases, there are two laser beams traveling in opposite directions relative to each other around the ring. The positioning of the mirrors in the corners of the ring, or triangle, direct the laser beams down the channels of the resonant cavity. At one of the corners, the mirror must take the form of a so-called beam splitter. There a portion of each of the laser beams is reflected into the resonating cavity while another portion of each of the beams is transmitted through the mirror into a readout assembly. Some examples of ring laser gyros are shown and described in U.S. Pat. Nos. 3,373,650; 3,390,606; 3,467,472; and 4,152,071, all of which are assigned to the assignee of the present application.

It is conventional in such readout arrangements that the mirror at the readout corner of the triangular path between the ring laser gyroscope body is formed on a flat substrate member having parallel inner and outer surfaces. A suitable prismatic readout member is then bonded to the outer surface of the substrate member. The prism is used to fold at least one of the laser beams to make both beams emerge from the prism in substantially the same direction. This produces an interference pattern which may then be detected as a function of the freqency difference of the two beams, hence of the rotation of the ring laser structure. In such structures, the alignment of the readout optics to combine the beams is generally time-consuming and expensive and frequently introduces stability problems.

In U.S. Pat. No. 4,288,163 there is shown a readout structure for ring-laser gyro wherein the readout prism also serves, in an incidental showing, as the substrate for a partially reflecting so-called beam-splitter. That structure, however, is a highly complex symetrical prism providing triple internal reflection of both beams to provide converging beams at the output thereof.

SUMMARY OF THE INVENTION

It is, accordingly, an object of the present invention to provide an improved readout apparatus for a ring laser gyro which avoids the shortcomings of the previous devices.

In accomplishing this and other objects, there has been provided, in accordance with the present invention, an optical readout arrangement which features a unitary optical element which serves both as a substrate for the corner mirror of the ring laser gyro and as a prismatic beam folding and combining arrangement for the readout elements.

BRIEF DESCRIPTION OF THE DRAWING

A better understanding of the present invention may be had from the following detailed description when read in the light of the accompanying drawing in which the single figure is a fragmentary representation of a ring laser gyro embodying the present invention.

DETAILED DESCRIPTION

Figure 1:
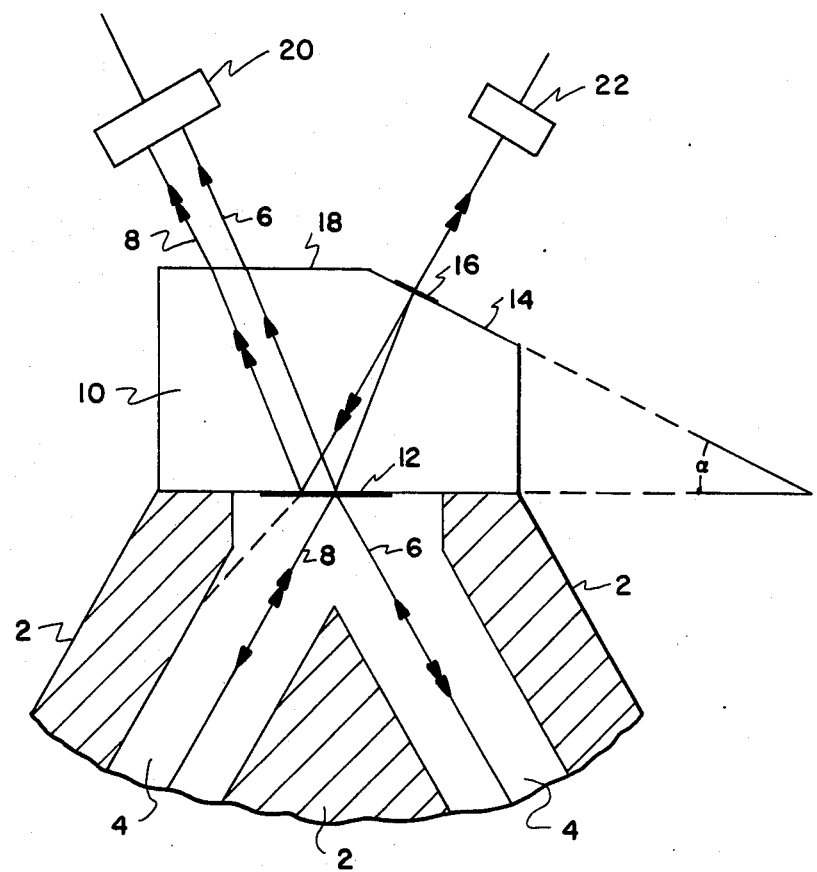

Referring now to the drawing in more detail, there is shown in the single figure a fragmentary portion of a ring laser gyro structure wherein a mechanically and thermally stable block 2 which, in a preferred embodiment, is triangular in configuration. The block 2 has formed therein a cavity 4. The cavity is sealed at each of the corners by a substrate block which carries a reflector at the inner surface thereof. The thus sealed cavity 4 is filled with a suitable lasing gas as is well-known in the art. Also included, but not shown herein nor forming a part of the present invention, is suitable exciting means for generating a laser beam in the cavity 4. As previously noted, the laser beam in the cavity 4 is actually in the form of two counter-rotating laser beams. A first such laser beam 6 is indicated by a single arrowhead, while the second laser beam 8 is indicated by a double arrowhead. At the selected corner of the ring laser block 2 there is positioned a reflector substrate member 10. The substrate 10 is preferably made of the same substance as the block 2. This has the characteristic of being mechanically and thermally stable. Additionally, the characteristic is such that it is relatively transparent to the light of the laser beam. The substrate 10 is suitably bonded to the corner of the block 2 thereby sealing the cavity at that corner. The inner major surface of the substrate 10 is provided with a suitable beam splitter 12 which reflectes a major portion each of the two laser beams approaching from their respective legs of the cavity 4 back into the other legs of the cavity 4 to provide the counter rotating beams within the cavity. A second portion of the beams 6 and 8 are transmitted through the beam splitter 12 into the substrate 10.

In the systems heretofore, the substrate 10 has been in the form of a transparent block having a rectangular cross-section in the plane of the path of the light beams. Then a prism is superimposed upon the substrate and used to redirect the light beams in internal paths to provide the desirable combination of the light beams to produce the desired interference pattern which, in turn, may be detected as a readout of the ring laser gyro. As hereinbefore noted, the positioning of the prism on the second major surface of a reflector substrate block introduces bonding stresses and requires a considerable time and effort in positioning and adjusting the prismatic elements during the curing and consequential dimensional changes of the cement or bonding agent. In accordance with the present invention, those difficulties are avoided. In accordance with the present invention, one corner of the substrate member 10, opposite from the beam splitter 12 is cut off at a predetermined angle alpha. The cut off corner forms a new surface 14 which is polished and provided with reflective coating in the form of a beam splitter 16. A surface portion 18, which comprises the uncut portion of the surface opposite from the beam splitter 12, constitutes an exit port for the combined laser beams.

As may be seen from the drawings, the first laser beam 6 which is illustrated as being the counter-clockwise rotating laser beam impinges on the beam splitter 12 whereat a major portion of the beam 6 is reflected back into the cavity 4 in the leg opposite from the one in which it approached the beam splitter 12. The remainder of the beam 6, indicated by the single arrowheads, is transmitted through the beam splitter 12 into the substrate 10, out through the surface 18 thereof and directed to impinge upon a detector 20. The clockwise beam 8, indicated by the double arrowheads, impinges upon the beam splitter 12 with a major portion of the beam being reflected back into the cavity along the leg opposite the one from which it approached the beam splitter 12. The remaining portion of the beam 8 is transmitted throught the beam splitter 12 into the substrate member 10 to impinge upon the beam splitter 16 positioned on the surface 14. Here, again, the beam 8 has a major portion reflected by splitter 16 into the substrate member 10 to again impinge upon the opposite surface of the beam splitter 12. There, the beam 8 is primarily reflected back into the substrate 10 toward the surface 18 to exit therefrom and impinge upon the detector 20. A small portion of the beam 8 which impinges upon the beam splitter 16 is transmitted through the beam splitter 16 to impinge upon a second detector 22. The detector 22 may be used to ascertain the power level of the laser beam exiting from the beam splitter 16 thereby indicating the tuning of the resonant cavity 4.

The beams 6 and 8 exiting from the surface 18 and falling upon the detector 20 form interference patterns or fringes, which may be sensed by the detector 20 as an indication of the rotation of the ring laser gyro about a predetermined axis (not shown). The angle alpha is so chosen as to keep the angle between the beams 6 and 8 as small as possible in order to provide interferences fringes which are of detectable dimension. At the same time, the angle between the two beams should be such as to minimize the retransmission of energy from the beam 8 back into the cavity 4 through the beam splitter 12 in such a manner as to tend to produce lock-up of the counter-rotating beams.

Thus there has been provided, in accordance with the present invention, an improved readout structure for a ring laser gyro which is simplified in structure, which is economical to construct and to assemble and which provides an improved stability in assembly and operation.

The embodiments of the invention in which an exclusive property or privilege is claimed are defined as follows:

1. A ring laser angular rate sensor comprising:

a laser block for providing a ring laser path for first and second counter-propagating laser beams through interconnecting channels therein; and a readout having, a substrate including at least first, second, third surfaces, said first surface having portions thereof bonded to said block in proximity to said interconnecting channels, said second surface being at an acute angle relative to said first surface, beam splitter means, supported on said first surface, for reflecting a major portion of said first and second laser beams impinging on said beam splitter from one of said channels into an adjacent channel, for transmitting a smaller portion of said first beam into said substrate to exit through said third surface, and for transmitting a smaller portion of said second beam into said substrate toward said second surface, and reflection means, supported on said second surface, for reflecting a portion of said transmitted smaller portion of said second laser beam through said substrate to impinge on said beam splitter;

said beam splitter means further comprising means for reflecting a portion of the beam reflected from the reflection means toward said third surface and adjacent to the portion of said first beam that is transmitted through said beam splitter means, and said acute angle is selected to cause said first and second beam portions to exit through said third surface and closely adjacent to each other to produce interference fringes.

2. A readout apparatus as set forth in claim 1 further including a detector means positioned adjacent said third surface for detecting said interference fringes.

3. A readout apparatus as set forth in claim 2 wherein said reflection means on said second surface also comprises a beam-splitter which reflects a major portion of the beam portion incident thereon and transmits a further small portion there-through.

4. A readout apparatus as set forth in claim 3 further including a second detector for detecting said further small portion.

5. The apparatus of claim 1 wherein said ring laser path is in the form of a triangle.

* * * * *